Patented May 30, 1939

2,160,133

UNITED STATES PATENT OFFICE 2,160,133

PLASTICIZER FOR CELLULOSE DERIVATIVES

Carleton Ellis, Montclair, N. J., assignor to Standard Oil Development Company

No Drawing. Application September 18, 1937, Serial No. 164,497

10 Claims. (Cl. 260—644)

This invention relates to plasticizers applicable in the preparation of compositions containing soluble cellulose ethers and esters, especially cellulose nitrate or cellulose acetate. It also relates particularly to such plasticizers derived from petroleum hydrocarbons, and more specifically to olefinic or unsaturated hydrocarbons and polymerized products derived therefrom.

In the manufacture of lacquers or varnishes containing cellulose nitrate or acetate, in addition to the volatile solvent (which may comprise one or more liquids), there is often incorporated a substantial proportion of bodies designated as plasticizing agents. These bodies impart elasticity and ductility to the dried lacquer or varnish film obtained on evaporation of the volatile solvent. When such properties are imparted to the dried film, the latter may then contract or expand (e. g., due to temperature changes) with the surface on which it is applied. In this manner cracking or peeling of the film may be avoided and its adhesive qualities improved. Furthermore, when the cellulosic materials are employed in the making of molded articles incorporation of substantial proportions of plasticizers brings about a more rapid and even flow of the materials in the mold. Also molding operations may be conducted at much lower temperatures than when the plasticizer is absent.

A large number of plasticizing agents have been employed with cellulose nitrate. These include dibutyl phthalate or tricresyl phosphate, which may be used with or without the addition of castor oil, various esters of citric, oxalic or tartaric acid, as well as many vegetable oils, such as those from soya bean or cottonseed. A much more limited number of agents are applicable with cellulose acetate, the methyl or ethyl esters of phthalic or benzoic acid, triphenyl phosphate and aromatic sulphone amides being typical examples.

I have found that soluble cellulose derivatives, particularly cellulose ethers and esters, such as cellulose nitrate and acetate, may be plasticized and desirable qualities thereby imparted to these cellulosic materials by incorporation of nitrated or chlorinated and nitrated olefins. Examples of the latter are polymeric isobutylenes such as the dimer (or di-isobutylene) and trimer (or tri-isobutylene). These polymers are themselves olefins and may exist in two or more isomeric forms. As an illustration, two di-isobutylenes are known having the formulas

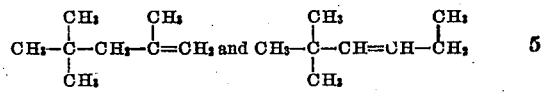

Tri-isobutylene, on the other hand, exists in at least three modifications whose formulas can be represented by

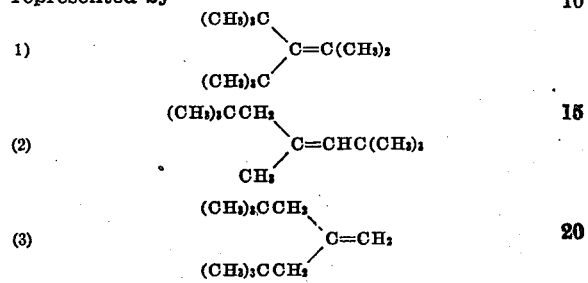

Any one of these isomers or mixtures of them are suitable for my purpose. Higher polymers, such as tetra-isobutylene, may be employed in some instances.

Other olefins which are applicable to my invention include polymers resulting from the co-polymerization of unsaturated hydrocarbons having the same or a different number of carbon atoms per molecule. Thus, the co-dimer resulting from the condensation of normal butylene and isobutylene is one example. Another is the co-dimer of isoamylene, or di-isoamylene. By co-dimer is meant the olefinic or unsaturated hydrocarbons resulting from the co-polymerization (or interaction) of two olefin molecules. For example, two propylene molecules may be co-polymerized to furnish a hexylene or mixture of hexylenes. Also, normal butylene and propylene furnish a heptylene or mixture of heptylenes.

I have found that nitrated or chlorinated and nitrated polymeric olefins of the types described above possess high boiling points and therefore can be considered as relatively nonvolatile though still exhibiting the requisite volatility desirable for plasticizing agents. In addition, they are substantially non-hygroscopic and insoluble in water, and are miscible with many organic solvents such as alcohol, acetone, monoethyl ether of glycol, benzol, ethyl acetate, dioxan and the like.

By the term soluble cellulose derivatives I mean such compounds as cellulose nitrate (often designated also as nitrocellulose), cellulose acetate, or the various ethers of cellulose, e. g., the ethyl or methyl ether, and the like. These derivatives, unlike the parent substance cellulose, are soluble in many organic solvents, or mixtures of these, particularly if the latter are anhydrous or substantially so. Furthermore, cellulosic materials often differ widely with regard to their solubility in a particular organic liquid. For example, cellulose nitrate dissolves in monoethyl ether of ethylene glycol while cellulose acetate is insoluble. However, the organic liquids, such as ketones, esters, ethers, alcohols, and the like, which may be solvents for the cellulosic bodies at hand are also solvents for the plasticizing agents made according to my invention.

As the source of olefins which are utilized in my invention preferably I employ the gases obtained from the cracking of crude petroeum oil or its distillates. The content of unsaturated hydrocarbons in cracking gases will vary considerably depending upon the type of cracking operation and particularly the temperatures and pressures employed. Gases from operations carried out at, say, temperatures of 800° to 900° F. and pressures of 200 to 400 pounds per square inch, will possess, say, 3 to 5 per cent of isobutylene (and normal butylenes), 10 to 15 per cent of propylene and small proportions of ethylene and amylenes. On the other hand, when higher temperatures (1000° F. or greater) and lower pressures (atmospheric or thereabouts) are used, the proportion of butylenes in the gases may be as great as 10 per cent, that of propylene as high as 20 to 25 per cent, and ethylene in some cases may constitute as much as 50 per cent or more of the cracking gas. Separation of a particular olefin fraction from admixed hydrocarbons may be effected by fractional condensation or by distillation under pressure, or by any other convenient means.

Polymerization of olefins may be carried out in a number of ways, as for example by treatment with activated clay, aluminum or ferric chloride, fluoboric acid, boron trifluoride, sulphuric acid or phosphoric acid. The temperature at which reaction occurs will vary considerably with the catalytic agent employed. Thus, with aluminum chloride or boron trifluoride polymerization takes place readily in many instances at atmospheric temperature, or lower. On the other hand, with activated clay, temperatures of 200°–400° C. and pressures of 5 or 6 atmospheres, or even higher, may be required.

When sulphuric acid is the catalyst it is often preferable that dilute aqueous acid, e. g., 50 to 80 per cent acid, be used. For example, a gaseous or liquid hydrocarbon fraction containing isobutylene is treated with sulphuric acid of 50 to 60 per cent concentration. The temperature may vary from atmospheric to as high as 100° F. The aqueous acid extract is then removed and heated to a temperature of 185° to 250° F., whereupon the polymers, mainly di-isobutylene and tri-isobutylene, separate from the aqueous layer.

Co-polymers of isobutylene and normal butylenes can be secured in the following manner. The fraction of refinery gases consisting of hydrocarbons possessing four carbon atoms per molecule is conducted, under pressure, through a tower filled with sulphuric acid of 60 to 75 per cent concentration and kept at a temperature of 150° to 300° F., preferably about 200° to 250° F. During reaction the pressure should be 300 to 400 pounds per square inch, sufficient to maintain the butylenes in the liquid phase.

Olefin polymers in some cases may be prepared by isomerization-polymerization, i. e., reactions involving simultaneous isomerization and polymerization and/or co-polymerization of the olefin (or olefins) undergoing treatment. By isomerization is meant a structural rearrangement of the olefin taking place without any change in its molecular weight. Illustrations of isomerization are the transformations of butene-1 to butene-2 and of isopropylethylene to trimethylethylene. An example of isomerization-polymerization is the subjection of normal butylenes, or hydrocarbon mixtures containing them but substantially free of isobutylene, to the same operation as that described above for the co-polymerization of isobutylene and normal butylenes, except that the time of contact is preferably longer because the rate of reaction is slower. Some degree of co-polymerization of the butylenes with olefins containing 3 or 5 carbon atoms per molecule occurs if these latter olefins should be present in the hydrocarbon mixture.

Polymeric olefins are made also by the use of a contact agent comprising phosphoric acid deposited on kieselguhr. When the hydrocarbon material employed is a fraction containing mainly isobutylene (admixed with small proportions of normal butylenes), the operating temperature is preferably about 250° F. and the pressure sufficient to maintain the hydrocarbons in the liquid phase (usually about 550 pounds per square inch), selective polymerization is effected. That is, the product is substantially polymeric isobutylenes. Non-selective or unselective polymerization may be secured by employing a hydrocarbon fraction containing a mixture of olefins possessing, say, 3, 4 or 5 carbon atoms per molecule. In this instance treatment is carried out at a higher temperature, e. g., 450° F., and a lower pressure, 100 to 200 pounds per square inch, thus keeping the hydrocarbon material undergoing treatment in the gaseous phase. In this manner a mixture of polymeric butylenes, amylenes, and the like, and co-polymers of propylene and butylenes, butylenes and amylenes, etc., may be prepared.

The products resulting from any one of the operations mentioned above, if desired, may be separated by fractional distillation into unchanged olefins, dimers, trimers, and a residue substantially of higher boiling polymers.

One procedure whereby I prepare plasticizing agents according to my invention is to treat the olefin, or polymerized olefin, with nitric acid of specific gravity 1.2 at a temperature of 70° to 80° C. Nitration may be effected in one stage, i. e., all of the acid required may be added to the portion of liquid hydrocarbon undergoing treatment and the mixture thoroughly agitated until reaction is complete. In some instances it may be desirable to effect nitration in two or more stages, in which case the olefin, or polymeric olefin, is treated first with a small portion of the nitrating agent. The aqueous layer, or spent acid, may then be withdrawn and a fresh portion of nitrating agent then added and treatment continued. More concentrated nitric acid, e. g., that having a specific gravity of 1.43, can be used also. When such strong nitrating agents are employed the temperature of reaction should be lowered, otherwise oxidation of the hydrocarbon material is likely to proceed to an undesirable degree. For example, with concentrated nitric acid of specific gravity 1.43, a temperature of about 40°–50° C. is often sufficiently high to secure nitration adequate for my purposes.

As an alternative procedure, a mixture of sulphuric acid and sodium nitrate can be employed as the treating agent. Furthermore, in some instances it may be desirable to use a catalyst of nitration. One example of such which I have found to be particularly effective is mercury, which may be added directly to the reaction mixture of nitric acid and hydrocarbon. Although certain salts of mercury which are soluble in the nitrating agent, e. g., mercuric nitrate, exhibit some catalytic action, nevertheless I find it preferable to incorporate a small proportion of the metal (mercury) with the reactants at the beginning of the nitration operation.

After treatment according to any of the foregoing procedures, the nitrated product is separated from the aqueous or acid layer, and then washed with water and/or a dilute aqueous solution of alkali. Examples of the latter are sodium or potassium hydroxide, carbonate or bicarbonate. In this manner any dissolved or entrained acidic bodies are removed. Another method whereby such bodies are eliminated comprises filtration of the nitrated product through a bed of alkaline material, e. g., calcium carbonate. The liquid product may then be dried, for example, by filtration through paper, or by contacting with anhydrous sodium sulphate or calcium chloride, or by any other convenient means.

Although, as previously mentioned, I may use a mixture of polymeric, or polymerized, olefins such as di-, tri- and tetra-isobutylene, nevertheless in some instances I find it preferable to fractionate such a mixture and nitrate only one or more fractions. By such fractionation I may substantially eliminate higher polymers (such as the tetramer or pentamer of isobutylene) and thus secure, by subsequent treatment with nitric acid, a plasticizing agent of increased effectiveness. Alternatively, after the nitration step, the liquid product may be subjected to fractional distillation, preferably under subatmospheric pressure, whereby unreacted hydrocarbons are separated from the higher-boiling nitrated derivatives, and a nitrated plasticizing agent of increased potency is secured. Still another procedure comprises distillation, at atmospheric or sub-atmospheric pressure, in the presence of an inert gas, e. g., steam or nitrogen.

As pointed out previously, one of the properties of the nitrated products from polymeric olefins is their low volatility at atmospheric temperatures, or in other words they are liquids possessing high boiling points. Further increase in the boiling temperatures, and consequently decrease in volatility, may be secured by subjecting the nitrated polymeric olefins to the action of a halogenating agent, e. g., chlorine. Alternatively, the hydrocarbon materials may be halogenated and then nitrated. Either operation, i. e., halogenation or nitration, may be controlled so as to proceed to a greater or lesser degree as desired. This mixture of nitrated and halogenated bodies, containing a substantial proportion of hydrocarbons possessing one or more halogen and nitro groups per molecule, are designated as nitrohalo compounds, or more specifically when chlorine is the halogenating agent, as nitrochloro compounds. By the term nitro group is included not only the $NO_2$ radical, but also such others containing both nitrogen and oxygen, e. g., the nitrate ($NO_3$), nitroso (NO) or nitrite (ONO) radicals. Any one or combinations of these nitro radicals may be present wholly or partially in the plasticizing agents prepared according to my invention.

Preferably I seek to prepare, according to my invention, compounds which possess at least two such oxygen-nitrogen-containing groups (or radicals) per molecule. Although these groups may be of the same type, e. g., two nitro ($NO_2$) radicals, nevertheless I find in many instances that two or more different groups, such as a nitro ($NO_2$) and a nitrite (ONO) radical, are present in the nitrated plasticizers. It will thus be noted that the desired nitrated plasticizing agents should have a nitrogen to carbon ratio varying from about 1:3 (for compounds made from the co-dimer of propylene) to about 1:6 (for materials prepared from tri-isobutylene).

Chlorination may be accomplished, for example, by bubbling gaseous chlorine through the liquid material under treatment. In most instances reaction takes place with the evolution of some heat and it may be necessary at times to cool the reaction mixture and thus prevent the reaction from getting out of hand. After a sufficient degree of chlorination has been secured, the liquid product is washed with water and dried.

Either the nitrated or nitrochloro polymeric olefins may be employed as plasticizing or softening agents in the preparation of coating compositions containing cellulose nitrate or acetate and/or cellulose ethers and intended to be applied as lacquers or varnishes. They may be used also to plasticize or gelatinize cellulose acetate before it is subjected to molding under heat and pressure.

The following examples will serve to illustrate my invention.

*Example 1.*—To 2 volumes of di-isobutylene were added 1 volume of nitric acid (specific gravity 1.20) and a small proportion of metallic mercury. The mixture was vigorously stirred for 4 hours, the temperature being maintained at 60° C. At the end of this operation the oily layer of nitrated product was removed, washed with water and dried. The specific gravity of the product was 0.820 as compared with 0.718 for the untreated di-isobutylene.

*Example 2.*—The product as prepared in Example 1 was subjected to vacuum distillation, the pressure being 25 to 30 mm. of mercury, and the temperature of the liquid in the still not allowed to exceed 40° C. A fraction, representing about 60 per cent of the charge to the still and presumably non-nitrated dimer, was obtained. The residue (specific gravity 1.0), which was a clear liquid of agreeable odor, gelatinized cellulose acetate.

*Example 3.*—Two volumes of di-isobutylene were treated with nitric acid (using mercury as a catalyst) for 3 hours at 60° C. as described in Example 1. At the end of this period the acid layer was withdrawn, 1 volume of fresh acid added and treatment continued for 3 hours longer. The oily layer was then separated, washed with water and dried. The liquid product in this instance had a specific gravity of 0.936. This nitrated polymerized isobutylene was a plasticizer for cellulose nitrate.

*Example 4.*—The product from Example 3 was distilled as described in Example 2. About 8 to 10 per cent overhead was collected. The residue was a clear liquid, of specific gravity slightly greater than 1.0, reddish in color, and of agreeable odor. It also readily dissolved cellulose nitrate and gelatinized cellulose acetate.

*Example 5.*—One hundred and fifty parts by weight of tri-isobutylene (specific gravity 0.75) were treated at 70°–80° C. with 120 parts by weight of nitric acid (specific gravity 1.2) for 3 hours. At the end of this time the spent acid was withdrawn and replaced by another portion (120 parts) of fresh acid and the treatment repeated. At the end of this second 3-hour treatment, spent acid was again withdrawn and nitration with a third portion of fresh acid was effected. After the third operation, the oily liquid was withdrawn, washed with water, then with 1 per cent aqueous sodium hydroxide, again with water, and then dried. The resulting clear, yellow liquid possessed a specific gravity of 1.005.

*Example 6.*—A solution was prepared which had the following composition, expressed in parts by weight: monoethyl ether of ethylene glycol, 40 parts; cellulose nitrate, 10 parts; nitrated tri-isobutylene (as prepared in Example 5), 1 part. A portion of this solution was spread on a glass surface and the solvent allowed to evaporate spontaneously. A clear, transparent film of plasticized cellulose nitrate was obtained.

*Example 7.*—A clear, plasticized film of cellulose nitrate was secured also when the proportions of ingredients, mentioned in Example 6, were 40 parts of monoethyl ether of ethylene glycol, 10 parts of cellulose nitrate and 2 parts of nitrated trimer.

*Example 8.*—A coating composition, which could be employed as a lacquer, was prepared by dissolving 10 parts of cellulose acetate and 1 part of nitrated trimer (prepared in Example 5) in 90 parts of dioxan.

*Example 9.*—Another coating composition was prepared which possessed the following ingredients:

| | Parts by weight |
|---|---|
| Cellulose acetate | 10 |
| Dioxan | 90 |
| Nitrated isobutylene trimer | 1 |
| Compatible synthetic resin | 0.5 |

The nitrated trimer was prepared as described in Example 5. A clear lacquer film was obtained when this composition was applied to a wood surface and allowed to dry.

*Example 10.*—The following proportions of ingredients were used in making another coating composition:

| | Parts by weight |
|---|---|
| ½-second cellulose nitrate | 10 |
| Nitrated isobutylene trimer | 2 |
| Monoethyl ether of ethylene glycol | 40 |
| Compatible synthetic resin | 0.5 |

The nitrated trimer in this instance was prepared as in Example 5. The composition gave a clear film when applied to a wood surface.

*Example 11.*—Nitrated trimeric isobutylene, as prepared in Example 5, was treated at room temperature (about 25° C.) with gaseous chlorine until the gain in weight of the liqiud product amounted to 10 per cent. The nitrochloro tri-isobutylene thus prepared was then washed with water and dried.

*Example 12.*—A coating composition, containing nitrochloro trimeric isobutylene (as made in Example 11) as a plasticizing agent, had the following constituents:

| | Parts by weight |
|---|---|
| ½-second cellulose nitrate | 10 |
| Monoethyl ether of ethylene glycol | 40 |
| Nitrochloro isobutylene trimer | 1 |
| Compatible synthetic resin | 1 |

This composition when applied to surfaces as a lacquer gave a clear transparent film.

*Example 13.*—Di-isobutylene was treated at room temperature with gaseous chlorine until the increase in weight of the reaction product indicated formation of the dichloro derivative. The oily liquid was then washed with water and dried. A portion of the dichlor compound (50 parts by weight) was treated at 60° C. with nitric acid (30 parts by weight) of specific gravity 1.20 for 3 hours. At the end of this time, the spent acid was withdrawn and the chloro derivative subjected to treatment for the same period of time and at the same temperature with a second portion of fresh acid (30 parts). A third treatment with the same quantity of nitric acid was then carried out. The resulting product was washed with water and dried. In this instance the specific gravity of the isobutylene dimer was 0.720, that of the dichloro derivative, 1.05, and that of the nitrochloro product was 1.17.

*Example 14.*—Nitrochloro dimeric isobutylene, as prepared in Example 13, was added to a solution of cellulose nitrate in monoethyl ether of ethylene glycol until the weight of the nitrochloro compound was 20 per cent that of the cellulosic material. The resulting homogeneous solution yielded clear, tarnsparent films when spread on glass plates and the solvent allowed to evaporate.

*Example 15.*—To a solution of cellulose acetate in dioxan was added nitrochloro isobutylene dimer, as prepared in Example 13, until the weight of the latter was 20 per cent that of the cellulosic derivative. The resulting homogeneous solution gave clear, transparent films when spread on glass plates and allowed to dry.

*Example 16.*—A coating composition was made according to the following formula:

| | Parts by weight |
|---|---|
| Ethyl cellulose | 10 |
| Monoethyl ether of ethylene glycol | 20 |
| Acetone | 20 |
| Nitrated isobutylene trimer | 1 |

The nitrated isobutylene trimer was obtained as described in Example 5. The composition was a homogeneous solution which when applied as a lacquer furnished clear, transparent films.

*Example 17.*—A composition, which could be used as a lacquer, was prepared by dissolving 4 parts of ethyl cellulose in 45 parts of monoethyl ether of ethylene glycol, and then incorporating as the plasticizing agent 1 part of nitrochloro tri-isobutylene. The latter substance was prepared as described in Example 11.

*Example 18.*—Tri-isobutylene was distilled under a pressure of 2 to 3 mm. of mercury, and divided into two fractions, one boiling at 45°–65° C., and the other at 65°–70° C. The lower-boiling fraction was nitrated as described in Example 5. To a solution consisting of 45 parts of dioxan and 5 parts of cellulose acetate was added 0.5 part of the nitrated tri-isobutylene fraction. This composition yielded transparent films when used as a lacquer.

*Example 19.*—The higher-boiling fraction, as obtained in Example 18, was nitrated in the following manner. Fifty volumes of the hydrocarbon material were treated for 3 hours at 60° C. with 25 volumes of nitric acid (specific gravity 1.3). At the end of this time the acid layer was withdrawn, another portion of nitric acid (25 volumes) was added, and treatment continued for 3 hours more. The aqueous layer then was withdrawn, and the nitrated product washed with water and dilute alkali and finally dried. This nitrated tri-isobutylene could be incorporated as a plasticizing agent in coating compositions containing cellulose acetate.

*Example 20.*—Tri-isobutylene, 50 volumes, was agitated with nitric acid (specific gravity 1.42), 30 volumes, for 4 hours. The reaction temperature was maintained at 50° C. The resulting nitrated product was washed with water and dilute alkali and then dried. A coating composition consisting of 45 parts of dioxan, 5 parts of cellulose acetate, and 0.5 part of this nitrated trimeric isobutylene was prepared. It yielded transparent films when applied as a lacquer.

*Example 21.*—To 50 volumes of nitrated tri-isobutylene, prepared as described in Example 5, were slowly added 5 volumes of bromine. The mixture was stirred for several hours at room temperature. The liquid reaction product (specific gravity 1.18) was washed with water and dilute aqueous alkali and then dried.

*Example 22.*—A coating composition was made which consisted of 90 parts of dioxan, 10 parts of cellulose acetate, and 2 parts of nitrobromo polymeric isobutylene obtained as described in Example 21. This composition when used as a lacquer yielded clear, transparent films.

*Example 23.*—Two hundred and fifty volumes of butylene co-dimer (prepared by the copolymerization of normal butylene and isobutylene (were treated for 2 hours at 70° C. with 125 volumes of nitric acid (sp. gr. 1.20). At the end of this time the spent acid was separated from the hydrocarbon material and the latter treated again with a fresh portion (125 volumes) of nitric acid. This method of operation was repeated until the oily hydrocarbon layer showed no appreciable increase in specific gravity. It was washed with water, then with 0.5 per cent aqueous caustic soda, again with water, and afterwards dried over anhydrous sodium sulphate. The resulting clear yellow oil (after filtration from the sodium sulphate) had a specific gravity 1.115.

*Example 24.*—The nitrated co-dimer from Example 23 was employed in the preparation of a lacquer having the following composition:

| | Parts by weight |
|---|---|
| Cellulose acetate | 5 |
| Nitrated co-dimer | 5 |
| Acetone | 25 |
| Monomethyl ether of ethylene glycol | 25 |

When sufficient quantity of this lacquer was poured onto glass and the solvent allowed to evaporate, a clear, transparent, plasticized film (about 3/32 inch thick) was obtained.

*Example 25.*—A portion of the film, as prepared in Example 24, was stamped in a cup press, at 70° C. and 3000 lb. per sq. in. pressure, for 5 minutes to give a well-formed, translucent cup.

*Example 26.*—One part by weight of the nitrated dimer, as prepared in Example 23, was incorporated with 2 parts by weight of cellulose acetate. The resulting powder when molded for 5 minutes, at 70° C. and 3000 lb. per sq. in. pressure, in a cup mold, furnished a well-formed, translucent cup.

When cellulose acetate alone was employed and the temperature increased to 200° C. and the pressure to 4000 lb. per sq. in., the cup obtained was opaque, heterogeneous in appearance, and full of large cracks.

*Example 27.*—Sixty volumes of the co-dimer (boiling at 98° to 106° C. and having specific gravity 0.71) of isobutylene and propylene were treated with 30 volumes of nitric acid (specific gravity 1.2) for 3 hours at 60° C. and then for 3 hours at 70° C. A very small proportion of metallic mercury was added as catalyst. The spent acid was removed, and the oily layer treated again with nitric acid (specific gravity 1.2) until its specific gravity rose to 1.120. The oily product was washed and dried as described in Example 23.

*Example 28.*—A lacquer was made, using the nitrated co-dimer from Example 27, which had the following composition:

| | Parts by weight |
|---|---|
| Cellulose acetate | 2 |
| Dioxan | 18 |
| Nitrated co-dimer | 2 |

This lacquer yielded clear, transparent, plasticized films.

*Example 29.*—The presence of different nitrogen-oxygen-containing groups in a nitrated plasticizer was indicated in the following manner. Five cc. of the nitrated co-dimer, as prepared in Example 23, were added to 100 cc. of 1 per cent aqueous caustic soda and the mixture heated under reflux for one hour. At the end of this period the mixture was cooled to room temperature and extracted with ether to remove all material insoluble in the aqueous alkali. (Extract A.)

The aqueous portion was made just acid with hydrochloric acid, and then extracted with ether. (Extract B.) This removed any insoluble material which separated during the acidification step.

To one-half of the aqueous portion was added a drop of aniline and a small proportion of hydrochloric acid, and the resulting solution afterward poured into a dilute aqueous alkaline solution of resorcinol. A deep red color immediately developed. This was taken to indicate that nitrous acid, resulting from the reaction between sodium hydroxide and the nitrated plasticizer followed by acidifying with hydrochloric acid, had converted aniline into a diazonium compound which in turn coupled with resorcinol to give a red dye. Thus, the presence of the nitrite radical in the plasticizer was shown.

The other half of the aqueous portion was acidified with acetic acid and boiled to remove nitrous acid. It was then cooled to room temperature, some ferrous sulphate dissolved in it, and then concentrated sulphuric acid added very cautiously and slowly. At the junction of the concentrated acid and aqueous layers a deep-brown colored ring appeared. This indicated the presence of nitrates. The latter were apparently the result of interaction of alkali and plasticizer.

The ether extract (Extract A) was carefully evaporated and the oily residue taken up in aqueous alcohol. When the latter was made alkaline a deep color developed, indicating the presence of some nitro compounds which in turn were converted into the corresponding red iso-nitro-derivatives by the alkali.

*Example 30.*—One hundred volumes of polymeric propylene (specific gravity 0.73) were treated with 50 volumes of nitric acid (specific gravity 1.2) at 60° C. for 5 hours. At the end of this period the spent acid layer was withdrawn, and another portion (50 volumes) of nitric acid added. Treatment was then continued for 4 hours. The nitrated product (after removal of the spent acid) was washed with water, afterwards with a 1 per cent aqueous solution of sodium carbonate and then dried over sodium sulphate. Following this last step the nitrated product was subjected to distillation at a pressure of 12 to 13 mm. of mercury. The temperature of the liquid during distillation was not allowed to exceed 40° C. About 15 per cent of distillate was secured leaving about 85 per cent as a residue in the still. This residue, or nitrated polymeric propylene, had a specific gravity of 0.932.

*Example 31.*—A lacquer was made, using the nitrated polymeric propylene as prepared in Example 30, having the following composition:

| | Parts by weight |
|---|---|
| Nitrated olefin | 2 |
| Monoethyl ether of ethylene glycol | 8 |
| Cellulose nitrate | 2 |

This lacquer yielded clear, transparent, plasticized films when poured on a surface and the solvent permitted to evaporate spontaneously.

*Example 32.*—Polymeric olefins, applicable for the preparation of nitrated plasticizing agents, can be made in the following manner. A cracked butane cut containing 7 to 10 per cent of isobutylene, 16 to 20 per cent of normal butylenes, and the balance saturated hydrocarbons, is passed in the liquid phase through a column of sulphuric acid 11 feet in height and maintained at a temperature of 225° F. The acid strength is 60 per cent. After separating the polymer from unpolymerized hydrocarbons by distillation, it was found that the polymer amounted to approximately 50 per cent of the olefins initially present and was substantially a co-dimer of normal butylene and isobutylene.

*Example 33.*—The unpolymerized material, from Example 32, was found to contain 0.0 to 0.5 per cent of isobutylene, 12 to 14 per cent of normal butylenes, and the balance saturated hydrocarbons. This material was conducted through a tower 3 feet in height and filled with 60 per cent sulphuric acid held at a temperature of 225° F. The pressure within the tower was 400 pounds per square inch. The hydrocarbons passing from the top of the tower were cooled, and the polymer separated by distilling off unpolymerized material. Measurement of the polymer and analysis of the olefin content of the inlet and outlet materials indicated that about 25 per cent of the available olefins had been polymerized in the single passage of the hydrocarbons through the tower. The polymer consisted of about 90 per cent dimer and 10 per cent trimer.

Although the above examples illustrate batch operations whereby nitro and/or nitrochloro derivatives of polymeric olefins are made, I do not mean to preclude continuous treating methods. Thus, nitration may be carried out in a series of agitators and intermediate settling tanks, in which the liquid hydrocarbons and nitric acid flow from one container to another but in opposite directions. In this way untreated hydrocarbon comes in contact first with partially spent acid and fresh acid comes in contact first with partially nitrated hydrocarbons. Chlorination may be effected, for example, in packed towers in which a descending stream of nitrated polymeric isobutylene is treated with an ascending stream of gaseous chlorine. Many other procedures of continuous treating are applicable to the preparation of nitrated and/or nitrochloro polymers of olefins and my invention is not to be limited to any particular mode of operation.

It will be seen that my invention involves the preparation of a plasticizing and gelatinizing agent for soluble cellulose derivatives, especially for cellulose acetate and cellulose nitrate. More particularly it comprises a nitrated olefin as a plasticizing agent for soluble cellulose derivatives, the nitrated olefin possessing the requisite degree of miscibility with the soluble cellulose derivative and also the desired degree of volatility. By the term desired degree of volatility is meant that by very slow evaporation of a very small proportion of the nitrated plasticizer from the surface of the film (containing both a soluble cellulose derivative and a nitrated plasticizer) a case hardening, as it were, of the film takes place, thus preventing further loss of plasticizer. The greater proportion of the latter is thereby retained within the film, imparting to it such desirable qualities as elasticity and ductility.

My invention also involves the treatment of polymeric olefins, especially the dimers and trimers, with a nitrating agent such as nitric acid. Another phase comprises subjecting the nitrated polymeric olefin to the action of chlorine whereby nitrochloro derivatives are obtained which may also be employed as plasticizing and gelatinizing agents for cellulosic materials. The chlorination step may be effected either prior to or subsequent to the nitration operation. Such plasticizing or gelatinizing agents may be employed in the manufacture of coating compositions applicable as lacquers or varnishes. Furthermore they may also be incorporated with cellulose acetate to furnish a plasticized or gelatinized mixture suitable for conversion into molded products upon the application of heat and pressure.

As previously mentioned, a much greater variety of plasticizing agents may be employed with cellulose nitrate than with cellulose acetate. Furthermore, it appears that in general the plasticizers applicable with the acetate are for the most part derivatives of cyclic or aromatic compounds. That nitrated or nitrated and chlorinated hydrocarbons, derived from olefins not containing a ring structure, should be plasticizing agents for both types of cellulosic materials (nitrate and acetate) is unusual and unexpected.

What I claim is:

1. A plasticizing agent for soluble cellulose ethers and esters comprising essentially a member of the group consisting of the nitrated polymeric olefins of petroleum containing at least six carbon atoms.

2. A plasticizing agent according to claim 1 in which the polymeric olefin is the co-dimer resulting from the interaction of two olefins, each of said olefins having the same number of carbon atoms per molecule.

3. A plasticizing agent according to claim 1 in which the polymeric olefin in the co-dimer resulting from the interaction of two olefins, the said olefins having a different number of carbon atoms per molecule.

4. A plasticizing agent for soluble cellulose ethers and esters comprising essentially a member of the group consisting of the nitrochloro polymeric olefins of petroleum containing at least six carbon atoms.

5. A plasticizing agent according to claim 4 in which the polymeric olefin is the co-dimer resulting from the interaction of two olefins, each of said olefins having the same number of carbon atoms per molecule.

6. A plasticizing agent according to claim 4 in which the polymeric olefin is the co-dimer resulting from the interaction of two olefins, the said olefins having a different number of carbon atoms per molecule.

7. A plasticizing agent for soluble cellulose ethers and esters comprising essentially a mixture of members of the group consisting of the nitrated polymeric olefins of petroleum containing at least six carbon atoms.

8. A plasticizing agent for soluble cellulose ethers and esters comprising essentially a mixture of members of the group consisting of the nitrochloro polymeric olefins of petroleum containing at least six carbon atoms.

9. A plasticizing agent for soluble cellulose ethers and esters comprising essentially the group consisting of the nitrated olefins of petroleum containing at least six carbon atoms.

10. A plasticizing agent for soluble cellulose ethers and esters comprising essentially a mixture of members of the group consisting of the nitrated halogenated polymeric olefins of petroleum containing at least six carbon atoms.

CARLETON ELLIS.